June 5, 1962  M. I. TAYLOR  3,037,723
HOUSINGS FOR JET PROPULSION GAS TURBINE ENGINES
Filed Aug. 11, 1960  2 Sheets-Sheet 1

Maurice Ian Taylor
Inventor
By Cushman, Darby & Cushman
Attorneys 3,037,723
**HOUSINGS FOR JET PROPULSION GAS
TURBINE ENGINES**
Maurice Ian Taylor, Derby, England, assignor to Rolls-Royce Limited, Derby, England
Filed Aug. 11, 1960, Ser. No. 48,970
Claims priority, application Great Britain Aug. 13, 1959
4 Claims. (Cl. 244—23)

This invention relates to housings or nacelles for jet propulsion gas turbine engines which are arranged so as to provide vertical thrust to enable an aircraft to take-off and land in a substantially vertical direction.

The housings or nacelles for such engines are provided with flaps or doors which form a continuation of the outer wall of the housing when the engine is not in use and which can be opened to admit air into the engine and to permit exhaust gases from the engine to be discharged to atmosphere, and it is the object of this invention to provide an improved arrangement of the doors or flaps which admit air into the engine.

According to this invention a closure member or door for the air intake of a gas turbine engine housing or nacelle comprising at least two flap members pivotally connected together, one of which is pivotally connected to the housing or nacelle, whereby they are movable between a position in which they close the intake and are coplanar and a second position in which they are folded one upon the other about their pivot connection and uncover the inlet.

A closure member or door in accordance with the present invention is preferably used in connection with the housing for an engine which is arranged to produce a vertical downward thrust for vertical take-off and landings.

The air intake may be closed by two closure members as defined above.

The cross-sectional shape of the flap member is preferably such that when they are moved to open the air intake they serve to deflect air into the engine.

In order that the invention can be clearly understood and readily carried into effect one construction of a housing or nacelle having air intake doors in accordance with the invention will now be particularly described, by way of example only, with reference to the accompanying drawings in which.

Figure 1:
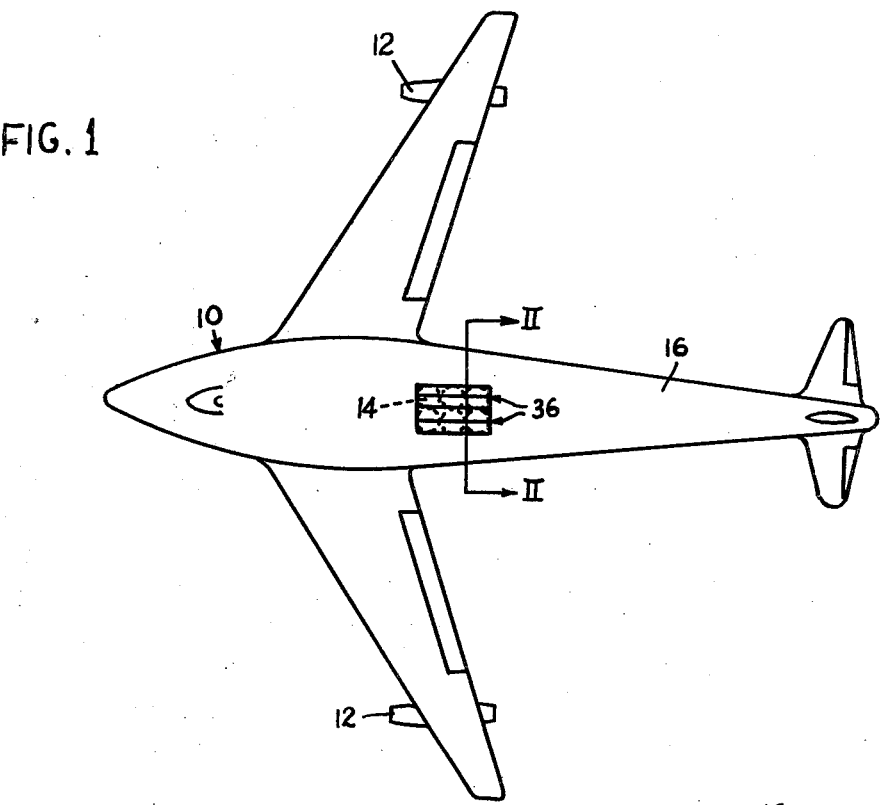
FIGURE 1 is a plan view of an aircraft having a bank of lift engines which are carried in housing incorporating doors in accordance with the invention.
Figure 3:
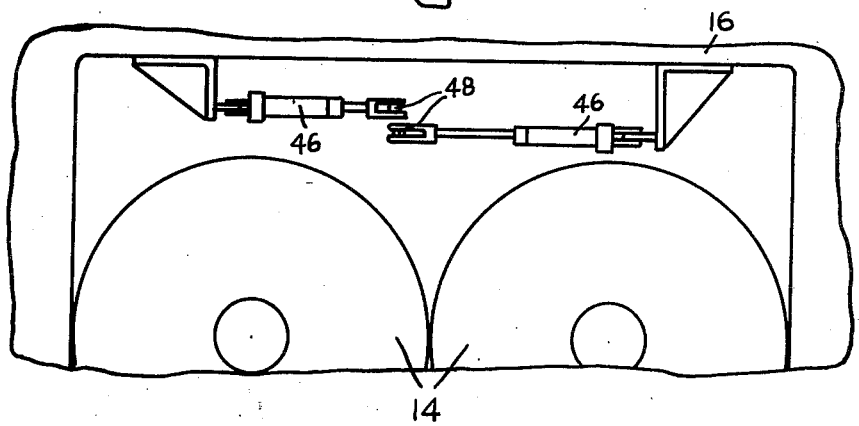
FIGURE 3 is a partial plan view of the invention.

Referring to the drawings, 10 indicates an aircraft having forward propulsion engines 12 and a bank of say six lift engines 14 mounted in the fuselage 16 and disposed three on each side of the longitudinal axis of the aircraft. The lift engines are gas turbine jet propulsion engines which are mounted with their longitudinal axis in a substantially vertical position whereby when they are in operation they provide thrust in a substantially vertical direction.

Thus an aircraft incorporating such engines can take off and land in a vertical direction.

Figure 2:
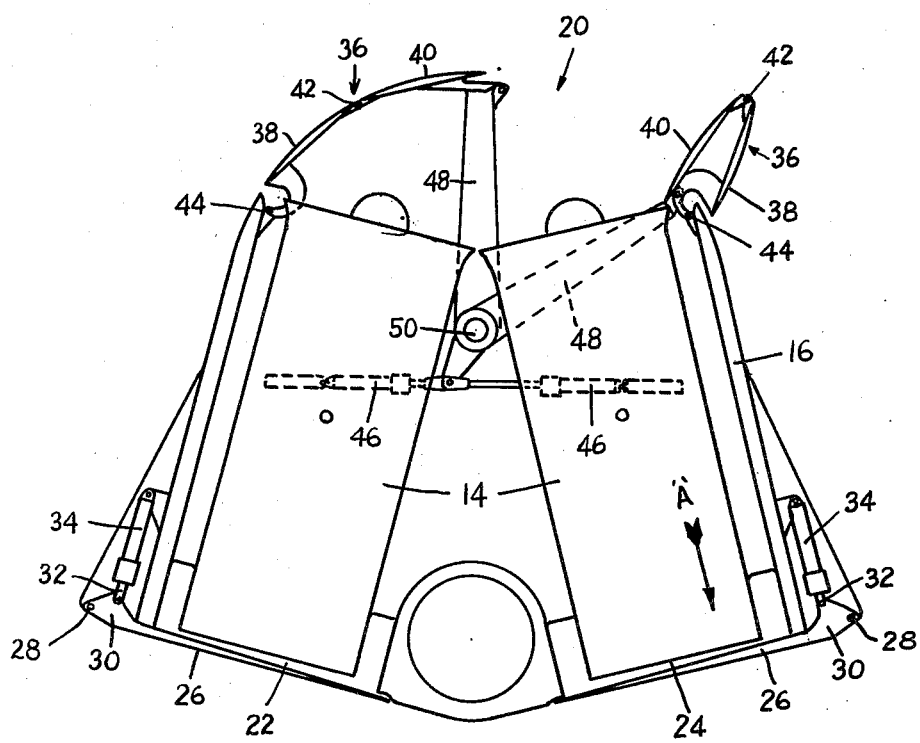
FIGURE 2 is an enlarged sectional view on line II—II in FIGURE 1.

Each engine 14 is supported on trunnions and has its longitudinal axis inclined to the vertical plane of the longitudinal axis of the aircraft, as shown in FIGURE 2 of the drawings. The compressor inlets of all of the engines 14 communicate with a common air inlet 20, while the exhaust nozzles of those engines on one side of the longitudinal axis of the aircraft communicate with an outlet 22, and those on the other side of the longitudinal axis communicate with an outlet 24.

In order that the air inlet 20 and the outlets 22 and 24 can be covered when the engines 14 are not in use, closure means are provided which when positioned to cover the inlet and outlets form a smooth continuation of the fuselage 16.

The closure member for each of the outlets 22 and 24 comprises a flap member 26, which extends over the full width and length of the outlet, and which is pivotally mounted on a pin 28 to permit it to be moved between a position in which it covers the outlet and a position in which the outlet is uncovered.

An extension 30 is formed on the flap member 26 connected to the piston rod 32 of a hydraulic ram 34, pivotally supported on the aircraft structure to allow for the arcuate movement of the extension 30 about its pivot 28.

It will be seen from FIGURE 2 of the drawings that as the rods 32 are moved in the direction of arrow "A" the flap members 26 will be moved to a position in which they uncover the outlets.

The air inlet 20 is provided with two doors 36, each of which extends over half of the width of the inlet and over the full length thereof, the arrangement being such that when the doors are moved to cover the inlet they meet at the longiudinal centre line of the inlet to completely cover it.

Each door 36 comprises two parts 38, 40 which are arcuate in cross-section so that when they are positioned so as to cover the inlet 20 one forms a smooth continuation of the other that is they are both disposed in the same plane of curvature. The two parts are pivotally connected together by a pivot member 42 while they are pivotally connected to the fuselage 16 by a pivot member 44. The pivot members 42 are adapted to limit the movement of the two parts 38 and 40 towards the interior of the housing relative to the pivot members 44. In other words, the pivot members 42 act as stops when the parts 38 and 40 are positioned to cover the inlet, the pivot member preventing the parts 38 and 40 from moving inwardly toward the housing when the arms 48 are actuated to open the doors.

Means are provided for moving the doors 36 between a position in which they cover the air inlet 20 and a position in which they uncover the inlet, the said means comprising two hydraulic jacks 46 one for each door 36, which are connected to the doors by means of pivoted arms 48, one end of each arm 48 being pivotally connected to the free end of one of the doors 36 while the other end is pivotally connected to the jack 46. The pivot member connecting the arm 48 to the door 36 is arranged so as to run in a track in the fuselage.

The arms 48 are pivotally mounted on a stub shaft 50 connected to part of the aircraft structure, which defines the housing for the lift engines, the arms being disposed in spaced apart relationship axially of the stub shaft 50.

Thus, when it is desired to move the doors 36 to a position in which they uncover the air inlet 20, the hydraulic jacks 46 are actuated so that their rams turn the arms 48 about their pivot 50 in opposite directions, that is the arm connected to the right hand door is caused to turn in a clockwise direction, whilst the arm connected to the left hand door is caused to turn in an anti-clockwise direction.

As each arm is rotated it will be seen that the part 38 of each door 36 will be turned about its pivot connection with the part 40 so as to project towards the interior of the housing, the movement of the part 38 causing the part 40 to be turned about its pivot 42 into a position in which it protrudes beyond the outer periphery of the housing.

Continued movement of the arm 46 finally results in the parts 38, 40 attaining the position occupied by the right hand door shown in FIGURE 2 of the drawings, in which the door 36 is folded about its pivot 42 whereby the part 38 has its concave surface facing the concave surface of the part 40.

Thus it will be seen that the convex surface of the part 40 will serve to deflect air into the intake of the lift engines, while assisting to produce laminar flow of the air.

It will also be appreciated that the doors 36 offer little areodynamic drag to the aircraft when positioned to admit air into the intakes of the lift engines 14.

Furthermore the jacks 46 and 34 are so interconnected so that pressure fluid is admitted to all of them simultaneously so that all of the doors are opened or closed simultaneously.

What I claim is:

1. An aircraft of the jet lift type having at least one lift engine of the gas propulsion type arranged to deliver thrust in a substantially vertical direction, an engine housing for the vertical lift engine, said engine housing defining an air inlet and outlet for the lift engine, a closure member for the air inlet, said closure member comprising two flap members pivotally connected to each other, one of said flap members being pivotally connected to said housing, means to move two flap members between a position in which they close the air intake and form a continuation of the wall of the housing and a second position in which they are folded one upon the other about their pivotal connection to each other and extend outwardly of the housing in a direction to define an air deflector for deflecting a laminar flow of air into the air intake, the innermost of said flap members when in the open folded position being disposed to project within the boundary of the housing to define an uninterrupted surface for guiding air into the air intake.

2. The aircraft of claim 1 in which said flap members each have an arcuate cross-section, said flap members when in said second position define a member of air foil cross-section.

3. An aircraft of the jet lift type having at least one engine of the gas propulsion type arranged to deliver a thrust in a substantially vertical direction, an engine housing for the vertical lift engine, said engine housing being open at one end to define an air inlet and at the other end to define an air outlet for the lift engine, a closure member for the air inlet, said closure member comprising a pair of doors each pivotally connected to the housing on opposite sides of the opening for the air inlet, each door comprising two flap members pivotally connected to each other, means for actuating said doors from a position in which they close the air inlet opening of said housing to a second position in which their respective flap members are folded one upon the other and extend outwardly of the housing in a direction to define an air deflector for deflecting a laminar flow of air into the air intake, said last-mentioned means comprising a pair of levers pivotally mounted on a common axis and respectively pivotally connected to one of the flap members of each of said doors, and a pair of actuating members respectively pivotally connected to said pair of levers.

4. The aircraft of claim 3 in which said levers are respectively pivotally connected to the flap members of said doors remote from the pivotal connection between the flap members and said housing, said levers being arranged to cause said flap members when moved to said second position to slightly project within the boundary of said housing to define an uninterrupted surface for guiding air into the air intake.

References Cited in the file of this patent

UNITED STATES PATENTS

| 2,731,221 | Holton | Jan. 17, 1956 |
| 2,936,969 | Griffith | May 17, 1960 |

FOREIGN PATENTS

| 806,030 | Great Britain | Dec. 17, 1958 |